United States Patent [19]
Zurit et al.

[11] 3,906,986
[45] Sept. 23, 1975

[54] CHECK VALVE FOR BEER DISTRIBUTING SYSTEM

[75] Inventors: David Zurit, Tenafly, N.J.; Frank Sciara, Floral Park, N.Y.

[73] Assignee: Vending Components, Inc., Hackensack, N.J.

[22] Filed: Feb. 4, 1974

[21] Appl. No.: 439,311

[52] U.S. Cl. ...... 137/212; 137/516.29; 137/533.15; 222/400.7
[51] Int. Cl.² ...................... B67D 1/72; F16K 15/04
[58] Field of Search..... 137/516.29, 533.11, 533.15, 137/212; 222/400.7

[56] References Cited
UNITED STATES PATENTS

| | | | |
|---|---|---|---|
| 3,009,476 | 11/1961 | Usab | 137/533.15 X |
| 3,091,254 | 5/1963 | Kilayko | 137/533.15 X |
| 3,327,635 | 6/1967 | Sachnik | 137/533.15 X |
| 3,346,008 | 10/1967 | Scaramucci | 137/533.15 X |
| 3,473,556 | 10/1969 | Johnson et al. | 137/516.29 X |
| 3,548,869 | 12/1970 | Weise et al. | 137/516.29 |
| 3,561,822 | 2/1971 | Gaylord et al. | 137/516.29 X |
| 3,620,653 | 11/1971 | Gaylord et al. | 137/533.15 X |
| 3,766,940 | 10/1973 | Mason | 137/533.11 X |
| 3,770,001 | 11/1973 | Davis | 137/533.15 X |

*Primary Examiner*—Alan Cohan
*Assistant Examiner*—Gerald A. Michalsky
*Attorney, Agent, or Firm*—Sandoe, Hopgood & Calimafde

[57] ABSTRACT

This distribution system for beer or the like has passages for communication with a keg or other container. One of the passages is for liquid and the other is for gas. When distributing liquid from the container, gas pressure is maintained on the liquid through the gas passage, and a check valve in the gas passage prevents escape of gas from the container and also stops any surge of liquid into the gas supply passage. The check valve element is preferably a ball that seats against a resilient lip at one end of a quad ring. The ball distorts the resilient lip to a larger inside diameter as the ball moves into the quad ring. An extremely small excess of gas pressure over container pressure will open the valve to admit more gas into the container.

9 Claims, 7 Drawing Figures

US Patent  Sept. 23, 1975  3,906,986
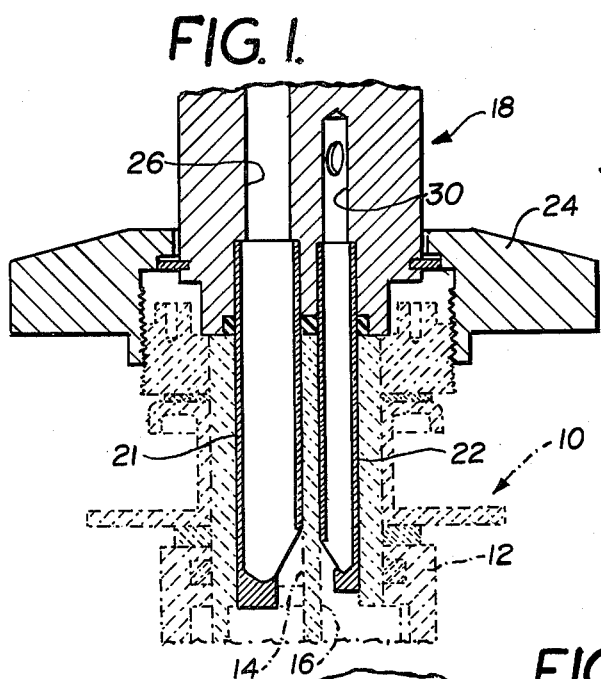
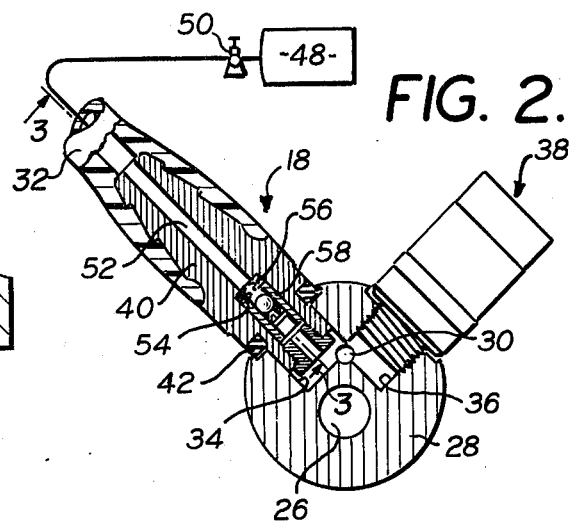
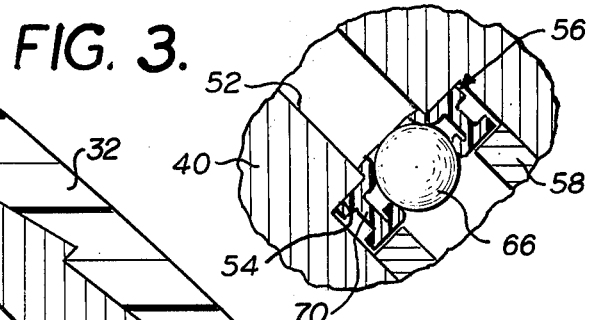
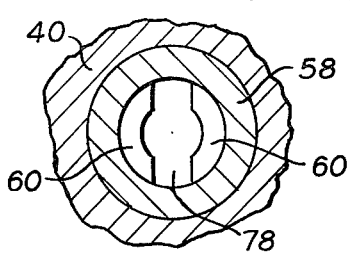
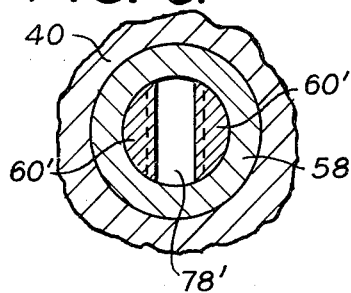
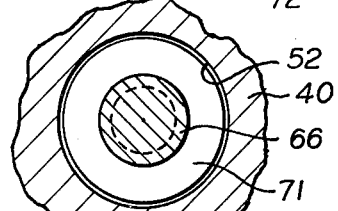

CHECK VALVE FOR BEER DISTRIBUTING SYSTEM

BACKGROUND AND SUMMARY OF THE INVENTION

One type of distribution system for beer or the like has a fitting with two hollow prongs that extend into complementary openings in a fitting on a keg or other container. One of the prongs is the entrance to a passage for liquid flowing from the container; and the other prong is part of a passage for supplying gas to the container to maintain the pressure as liquid is withdrawn.

There is a check valve in the gas passage for preventing escape of gas from the container, and when the distribution system is in operation it is the usual practice to maintain a supply of gas under pressure through the gas line so as to maintain the full container pressure as liquid is withdrawn from the container.

When the check valve in the gas line is in closed position, it is desirable to have the check valve movable into open position with a minimum of gas pressure from a gas supply line. If considerable excess of the gas supply pressure is required to open the check valve, then the pressure at which gas is supplied to the container is either excessive, or else the pressure in the container must be allowed to drop below the desired value in order to have the check valve open to build up pressure in the container to the intended value. In order to have an automatic system, and to prevent excessive variations of gas pressure in the container, the check valve in the gas line must open to supply fresh gas with a minimum of pressure differential across the check valve.

This invention provides such a check valve by using a valve element which seats against a resilient lip that is distorted by a rounded front face of the valve element to permit the valve element to move part way, or all the way, into the resilient lip to provide a seal with light pressure so long as the pressure differential on opposite sides of the valve element is small. If the pressure differential across the check valve becomes abnormally high, the check valve moves further into the seat and comes in contact with a second lip which is made of resilient material but provided with a shoulder behind it to prevent the valve element from distorting this second lip sufficiently to pass through it.

In the preferred construction the seat is a quad ring comprising a short sleeve portion with resilient lips at both ends. The second lip is held against excessive distortion by being located in front of a rigid shoulder at a place where the diameter of the gas passage decreases. In the preferred construction, the valve element is a ball.

A partition or other abutment located behind the ball limits the extent to which the ball can move away from the valve seat. This partition preferably centers the ball with respect to the valve seat and has openings for gas flow toward the container, which openings are in positions where they cannot be blocked by the valve element when the latter is in its open position.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view showing a portion of a beer keg and a distribution system on the keg and in which the check valve structure of this invention is used;

FIG. 2 is a sectional view through the tavern distribution fitting of the construction shown in FIG. 1;

FIG. 3 is an enlarged sectional view taken through a portion of the gas passage of FIG. 2 and on the section line 3—3 of FIG. 2;

FIG. 4 is a greatly enlarged, detail view taken through the quad ring or seat shown in FIG. 3, the ball valve element being shown in elevation;

FIG. 5 is an enlarged sectional view taken on the line 5—5 of FIG. 3;

FIG. 6 is a view similar to FIG. 5 but showing a modified form of the invention; and FIG. 7 is a greatly enlarged sectional view taken on the line 7—7 of FIG. 3.

DESCRIPTION OF PREFERRED EMBODIMENT

FIG. 1 shows a container consisting of a beer keg 10. A keg fitting 12 is permanently attached to the keg 10 and this keg fitting 12 includes two passages 14 and 16 which communicate with the interior of the keg. The passage 14 is for the flow of liquid from the keg 10 and this passage is extended by a tube leading to the bottom of the keg. The passage 16 is for the flow of gas into the keg to maintain pressure on the liquid. Additional gas must be introduced into the keg 10 to compensate for the removal of liquid as the beer is dispensed.

A tavern or distribution fitting 18 is attached to the keg fitting when the keg is to be connected with the distribution system of a tavern. The distribution fitting 18 has two prongs 21 and 22 which are located in position to register with the passages 14 and 16 when the distribution fitting is connected with the keg fitting. The interior open space of the prong 21 is a part of the liquid passage through the distribution fitting; and the passage through the prong 22 is a part of the gas passage of the distribution fitting.

Detachable fastening means 24 are provided for connecting the distribution fitting 18 with the keg fitting 12; but the construction thus far described is conventional and no further description of it is necessary for a complete understanding of the purpose and construction of the present invention.

FIG. 2 is a sectional view through the distribution fitting 18. The liquid passage in the fitting 18 is indicated by the reference character 26 which extends through a body 28 of the fitting. The gas passage through the body 28 is indicated by the reference character 30. It will be understood that these passages 26 and 30 are extensions of the passages through the prongs 21 and 22, respectively. The passage 26 leads to a hose fitting and a hose connected with the liquid distribution system of the tavern. The passage 30 communicates with two threaded bores 34 and 36 in the body 28. A pressure relief valve 38 is screwed into the bore 36. This pressure relief valve is for the purpose of venting gas from the passage 30 if the pressure rises above a predetermined maximum which is controlled by adjustment of the relief valve 38.

A hose fitting 40 is threaded into the bore 34 and there is a sealing washer 42 between a shoulder of the hose fitting 40 and a confronting flat surface of the body 28. The hose 32 is secured over the hose fitting 40 and this hose 32 leads to a gas supply tank 48. There is an adjustable pressure regulator 50 in the hose line 46 for regulating the pressure supplied to a passage 52 leading through the hose fitting 40 into the bore 34.

The passage 52 increases in diameter at a shoulder 54, and this increased diameter of the passage 52 extends to the end of the hose fitting 40.

A valve seat 56 is located in the large diameter portion of the passage 52 in contact with the shoulder 54. A bushing 58 fits into the passage 52 and holds the seat 56 in contact with the shoulder 54. There is a partition 60 extending across the bushing 58 and of unitary construction with the bushing. The purpose and structure of this partition 60 will be explained more fully in connection with FIGS. 5 and 6. A retainer 62 screws into a threaded end portion of the passage 52 and holds the bushing 58 against the valve seat 56. The retainer 62 has a polygonal end flange 64 for receiving a tool by which the retainer can be screwed into or out of the passage 52 for the purpose of changing the pressure on the seat 56.

A valve element 66 is located between the seat 56 and the partition 60. This valve element 66 has a rounded front face which extends into the passage through the seat 56. In the construction illustrated, the valve element 66 is a ball, preferably a ball bearing. The valve element 66 moves into contact with the seat 56 to close the passage 52 against gas flow in the direction toward the hose 32. This provides a check valve for preventing gas from flowing out of the keg if there is not adequate gas pressure supplied through the hose 32. The valve element 66 also acts as a check valve to prevent any surge of liquid, which may enter the gas passage from discharging up into the gas supply hose 32.

FIG. 3 shows the valve seat 56 as a quad ring having a sleeve portion 70 with a lip 71 extending inward from the sleeve portion 70 and another lip 72 extending outward as a flange from the sleeve portion 70. There are also lips 71' and 72' on the forward end of the sleeve 70. The quad ring is made of resilient elastomer material which is soft enough so that as the ball 66 moves into contact with the inner lip 71, the lip is distorted by the rounded front end of the ball 66 and this distortion increases the inside diameter or opening through the lip 71 so that the ball 66 can move further into the opening through the seat 56. This closing of the valve element or ball 66 against the lip 71 is effected with very light pressure and provides an adequate seal against gas pressure from the container escaping to the hose so long as the pressure behind the ball 66 is not much greater than the pressure in the hose and passage 52 above the ball 66.

By way of illustration, the diameter of the opening surrounded by the lip 71, when undistorted, may be so related to the diameter of the ball 66 that the initial contact of the ball with the lip 71 is around a circle which is angularly spaced by 45° or more from a center point on the ball 66 which represents the most forward point on the ball. As the lip 71 deforms and the opening surrounded by the lip increases in diameter, a zone of the ball surface contacts with the distorted area of the lip 71 to produce a light pressure seal of substantial area.

The inside diameter of the sleeve portion 70 of the valve seat or quad ring is equal to or somewhat greater than the diameter of the ball 66. The resilience of the lips and sleeve portion of the seat is such that abnormal pressure behind the ball 66 forces the full diameter section of the ball 66 through the opening surrounded by the lip 71 and into the interior of the quad ring which comprises the seat 56, as shown in FIG. 4.

With the ball 66 in the FIG. 4 position, the surface of the ball contacts with the lips 71 and 71' at the same time but in spite of the abnormal pressure behind the ball 66, it cannot deform the second or forward lip 71' to any great extent because of the shoulder 54 which braces the upper lip 71' against substantial distortion.

The diameter of the passage 52 beyond the shoulder 54 is less than the diameter of the ball 66 so that it is impossible for the ball to move fully into the passage 52.

In the preferred construction, the lip 71' extends inward somewhat beyond the wall of the passage 52 beyond the shoulder 54 so that there is some soft elastomer material between the ball 66 and the edge at which the passage 52 meets the shoulder 54. Thus there is always a soft washer effect between the ball and the shoulder 54 but the shoulder 54 actually resists the force of the ball 66 and provides a check valve construction that does not leak even though there is no gas pressure in the passage 52 in front of the ball 66; that is, on the gas supply side of the check valve.

The quad ring shown in the drawing can be replaced with a ring which does not have the outer lips 72 and 72'. The principle of operation is changed, and the results are not as good as with the preferred embodiment of the invention, but some of the advantages can be obtained.

From the description thus far, it will be apparent that this invention provides a check valve which closes under light pressure against a highly resilient seat when the pressure differential across the check valve is quite limited and within the range likely to be encountered as the result of discharge of liquid from a keg and application of additional gas under pressure from a regulator which is adjusted to supply pressure at the intended value for the interior of the keg. Because of the light pressure of the ball 66 against the deformable lip 71 under such conditions, a very slight drop in pressure behind the ball 66 permits the ball to open and admit additional gas into the keg. The pressure regulator continues to supply pressure at the intended value and the ball 66 remains out of contact with the lip 71 so that the gas pressure supply communicates directly with the interior of the keg. If there is an unintentional drop in the gas supply pressure, there will be an escape of gas from the keg back toward the supply hose and this will quickly close the valve 66 to prevent further escape of gas from the keg. When pressure is restored in the supply hose, the gas pressure will again move the ball valve 66 into open position without requiring any substantial pressure differential across the valve element 66 in order to again move it into open position.

If there is an abnormal pressure of gas behind the check valve 66, as might occur in the event that a hose from the gas supply should be damaged or disconnected, then the valve element 66 will move through the passage surrounded by the lip 71 and into contact with the upper lip 71' which is braced against substantial distortion by the shoulder 54 as already explained. This provides a check valve structure which will hold back the full pressure of the keg, and while it will not open without substantial initial pressure from the hose, this condition is one that does not occur in the ordinary operation of the apparatus. The seating of the ball 66 against the upper lip 71' may be described, therefore, as an emergency closing of the check valve.

In order to have the check valve close without the aid of a spring or other bias, the check valve ball 66 has a diameter which is only slightly less than the inside diameter of the bushing 58 so that there is a comparatively small clearance around the ball 66 and a pressure drop in the gas flow which moves the ball 66 into contact with the lip 71 even though the velocity of the gas toward the seat is comparatively low. The spacing of the ball 66 from the lip 71 when the ball is in open position is determined by the location of the partition which extends across the inside of the bushing 58. FIG. 5 shows the partition 60 with an opening 78 extending through it. This opening 78 is a slot with a center portion which is generally round for centering the ball valve element in the passage if the apparatus is designed to be used with the gas passage extending substantially vertically upward. Such centering is not necessary if the partition 60 is removed some distance from the valve seat and if the interior diameter of the bushing 58 is not substantially larger than the diameter of the ball.

FIG. 6 shows a construction similar to FIG. 5 but with a slot 78' extending across a partition 60' with the slot of uniform width across its full length.

FIG. 7 is a greatly enlarged sectional view on the line 7—7 of FIG. 3, the portion of the ball 66 in the plane of section being cross-hatched and the lip 71 being shown in elevation but with its opening shown in dotted lines since part of the surface of the lip 71 is behind the sectioned portion of the ball 66. The material of the hose fitting 40 beyond the inside wall 52 is also shown in section in FIG. 7.

The preferred embodiment of the invention has been illustrated and described, but changes and modifications can be made and some features of the invention can be used in different combinations without departing from the invention as defined in the claims.

What is claimed is:

1. In a distribution system for beer and the like, a fitting having two passages therein, including a passage for flow of liquid from a container, another passage for supplying gas under pressure to the container, a shoulder along the gas passage at a location where the diameter of the gas passage decreases, a check valve in the gas passage, the check valve including a valve element and a seat against which the valve element closes in response to gas flow in a direction away from the container, said shoulder having an inside diameter smaller than the diameter of the valve element, the seat including an elastomer sleeve having circumferential inwardly extending resilient lips at both ends thereof, retaining means, of larger diameter than the valve element and the lips, for holding the sleeve against the shoulder, the first of the resilient lips being in position to receive a front face of the valve element, the yielding of said first lip increasing the inside diameter of the opening through the seat to receive the front face of the valve element further into the opening surrounded by the resilient lip, when the valve element is closed by light back pressure of the gas, and the second of the resilient lips being in position to be clamped against the juncture of the shoulder with the reduced diameter portion of the gas passage by said valve element when there is substantially higher back pressure against the valve element.

2. The distribution system construction described in claim 1 characterized by the valve element having a rounded front face, the first lip being sufficiently resilient to expand the inside diameter of the lip to a diameter slightly less than the outside diameter of the widest part of the rounded front face of the valve element that extends into the sleeve portion of the seat when the valve is subjected to back pressure of gas from the container.

3. The distribution system construction described in claim 1 characterized by the valve element being a ball having a diameter slightly larger than the diameter of the passage opening through the undistorted lip, the diameter of the ball and passage opening through the lip being correlated so that the lip contacts with the ball at a surface more than 45° on all sides back from the point on the ball surface that is located furthest into said passage when the ball is in passage-closing position in contact with the first lip.

4. The distribution system construction described in claim 1 characterized by the sleeve having an inside diameter forward of the lip as great as the diameter of the ball, and the lip being distortable by abnormal back pressure of the ball to a passage diameter equal to the diameter of the ball so that the lip permits the ball to pass into the sleeve.

5. The distribution system construction described in claim 4 characterized by the second lip serving as an abutment that stops further forward movement of the ball before the ball passes far enough into the sleeve to loose contact with the distorted first lip of the valve seat.

6. The distribution system construction described in claim 5 characterized by the sleeve having the elastomer lips at each end thereof spaced from one another so that both lips contact with the ball at the same time and at different sides of an equator of the ball when the full diameter of the ball moves into the sleeve portion of the valve seat.

7. The distribution system construction described in claim 1 characterized by the sleeve being a quad ring of one-piece construction with both inwardly and outwardly extending lips at both ends of the sleeve.

8. The distibution system construction described in claim 1 characterized by means in the gas passage behind the valve element for limiting the movement of the valve element away from the seat when in open position for flow of gas around the valve element and toward the container, and means in the passage for holding the valve element centered with respect to the seat when in open position.

9. The distribution system construction described in claim 8 characterized by the means behind the valve element being a partition with a center opening into which the rearward portion of the valve element extends, the edges of said center opening being the means for holding the valve element centered, and an open area through the partition at a location that the valve element cannot close for free flow of gas through the passage toward the container.

\* \* \* \* \*